United States Patent Office 3,121,103
Patented Feb. 11, 1964

3,121,103
AMINOBENZOPHENONES
Oscar Keller, Clifton, Norbert Steiger, Nutley, and Leo Henryk Sternbach, Upper Montclair, N.J., assignors to Hoffmann-La Roche Inc., Nutley, N.J., a corporation of New Jersey
No Drawing. Filed May 28, 1962, Ser. No. 197,842
Claims priority, application Czechoslovakia Oct. 20, 1961
7 Claims. (Cl. 260—454)

This invention relates to benzodiazepine compounds, as well as intermediates therefor. More particularly, the invention pertains to benzodiazepines which are represented by one of the following formulas:

I

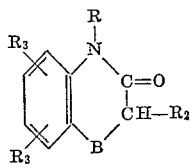

II

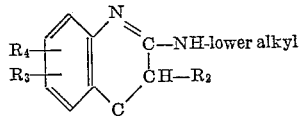

In the above formulas, B is selected from the group consisting of

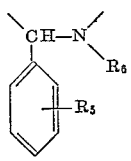

and at least one of $R_3$ and $R_5$ is a sulfur-containing radical selected from the group consisting of —S—$R_7$, —SO-lower alkyl and —$SO_2$-lower alkyl; $R_1$ is selected from the group consisting of hydrogen and lower alkyl; $R_2$ is selected from the group consisting of hydrogen and lower alkyl; $R_3$ is selected from the group consisting of hydrogen, halogen, —S—$R_7$, —SO-lower alkyl and —$SO_2$-lower alkyl; $R_4$ is selected from the group consisting of halogen and hydrogen; $R_5$ is selected from the group consisting of hydrogen, —S—$R_7$, SO-lower alkyl, —$SO_2$-lower alkyl, halogen and trifluoromethyl; $R_6$ is selected from the group consisting of hydrogen and lower alkyl; and $R_7$ is selected from the group consisting of lower alkyl, hydroxy-lower alkylene and halo-lower alkylene.

As used herein, the term halogen includes all four halogens, i.e. chlorine, fluorine, bromine, and iodine. The term alkyl includes straight and branched chain aliphatic hydrocarbon groups such as methyl, ethyl, propyl, isopropyl, butyl, isobutyl, t-butyl, amyl and the like. $R_7$ represents lower alkyl groups or lower alkyl groups containing a hydroxy or halo substituent, such as, for example, hydroxymethyl, chloromethyl, and the like. The symbol B represents a carbon-nitrogen grouping which completes the seven-member ring of the benzodiazepine and which is represented by one of the following:

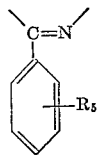

III

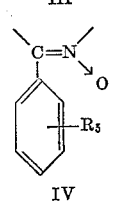

IV

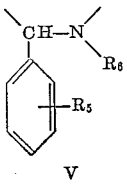

V

An illustrative group of compounds answering to the above description includes:

7-methylmercapto - 5 - phenyl - 3H - 1,4 - benzodiazepin-2(1H)-one
7 - methylmercapto-5-phenyl-4,5-dihydro-3H-1,4-benzodiazepin-2(1H)-one
7-ethylmercapto-5-phenyl-3H-1,4-benzodiazepin - 2(1H)-one
7 - butylmercapto-5-phenyl-3H-1,4-benzodiazepin-2(1H)-one
7-hydroxyethylamercapto-5-phenyl-3H-1,4-benzodiazepin-2(1H)-one
7-methylsulfinyl-5-phenyl-3H-1,4-benzodiazepin - 2(1H)-one
7 - methylsulfinyl-5-phenyl-3H-1,4-benzodiazepin-2(1H)-one 4-oxide
7 - methylsulfonyl - 5 - phenyl - 3H - 1,4 - benzodiazepin-2(1H)-one
7-methylsulfonyl-5-phenyl-3H-1,4-benzodiazepin - 2(1H)-one 4-oxide
7-chloro-9-methylmercapto-5-phenyl-3H-1, 4-benzodiazepin-2(1H)-one
7-chloro-9-methylmercapto-5-phenyl-3H-1,4 - benzodiazepin-2(1H)-one 4-oxide
7 - methylmercapto-2-amino-5-phenyl-3H-1,4-benzodiazepine 4-oxide
7-methylmercapto-2-amino-5-phenyl-3H-1,4 - benzodiazepine
7-methylmercapto-2-amino-5-phenyl-4,5-dihydro - 3H-1,4-benzodiazepine
7-methylmercapto-2-methylamino-5-phenyl - 3H-1,4 - benzodiazepine 4-oxide
7 - methylmercapto-2-methylamino-5-phenyl-3H-1,4-benzodiazepine
7-methylmercapto-2-methylamino-5-phenyl-4,5 - dihydro-3H-1,4-benzodiazepine
1 - methyl-7-methylmercapto-5-phenyl-3H-1,4-benzodiazepin-2(1H)-one 4-oxide
1-methyl-7-methylmercapto-5-phenyl-3H-1,4 - benzodiazepin-2(1H)-one 1-methyl-7-methylmercapto-5-phenyl - 4,5 - dihydro - 3H-1,4-benzodiazepin-2(1H)-one 7 - methylmercapto - 5 - phenyl - 3H - 1,4 - benzodiazepin-2(1H)-one 4-oxide 7-methylsulfinyl-2-amino-5-phenyl - 3H - 1,4 - benzodiazepine 7 - methylsulfinyl-2-2amino-5-phenyl-4,5-dihydro-3H-1,4-benzodiazepine 7-methylmercapto-5-(2-chlorophenyl)-3H-1,4-benzodiazepin-2(1H)-one 7-methylmercapto - 5 - (2-trifluoromethylphenyl)-3H-1,4-benzodiazepin-2(1H)-one 7-chloromethylmercapto-5-phenyl-3H-1,4 - benzodiazepin-2(1H)-one 7-methylmercapto-5-phenyl-4,5-dihydro-3H - 1,4 - benzodiazepin-2(1H)-one 7 - methylmercapto-5-phenyl - 1,4 - dimethyl-4,5-dihydro-3H-1,4-benzodiazepin-2(1H)-one 7 - methylsulfinyl - 5-phenyl-1,4-dimethyl-4,5-dihydro-3H-1,4-benzodiazepin-2(1H)-one 7-chloro-5-(2-methylmercaptophenyl)-3H-1,4-benzodiazepin-2(1H)-one Within the class of compounds described above, certain sub-classes constitute preferred groups. In general, the preferred compounds are those wherein $R_4$ is hydrogen and $R_3$ or $R_5$ represents either one of the following substituents: —S-lower alkyl or —SO-lower alkyl, particularly when these groups are in the 7-position or the 2'-position. Especially preferred are compounds of the Formula I wherein one of the symbols $R_3$ or $R_5$ has the preferred significance —S-lower alkyl or —SO-lower alkyl.

Certain intermediate compounds formed during the methods of synthesis described below are novel and within the scope of the invention. Novel 2-aminobenzophenone intermediates within the scope of the invention have the structural formula:

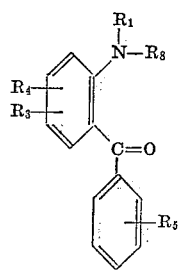

VI wherein $R_1$ is selected from the group consisting of hydrogen and lower alkyl; $R_3$ is selected from the group consisting of —S—$R_7$, —SO-lower alkyl and —SO$_2$-lower alkyl; $R_4$ is selected from the group consisting of hydrogen and halogen; $R_5$ is selected from the group consisting of hydrogen, halogen and trifluoromethyl; $R_7$ is selected from the group consisting of cyano, lower alkyl, hydroxy-lower alkylene and halo-lower alkylene; and $R_8$ is selected from the group consisting of hydrogen, α-halo-lower alkanoyl and p-tosyl.

The compounds of Formulas I and II are prepared from o-aminobenzophenones or appropriately substituted o-aminobenzophenones. For example, o-aminobenzophenone will react with sodium thiocyanate in the presence of bromine in a solvent such as methanol to introduce a thiocyano group in the 5-position and obtain 2-amino-5-thiocyanobenzophenone. The latter, when treated with sodium hydrosulfite and sodium hydroxide, is converted to the sodium salt of the 2-amino-5-mercaptobenzophenone. Then the lower alkyl or hydroxy-lower alkyl group is introduced by reaction with an alkyl sulfate, such as dimethyl sulfate, alkyl halide, such as ethyl bromide, or alkylene halohydrin, such as ethylene bromohydrin, as the case may be. The 2-amino-5-alkylmercaptobenzophenone can then be reacted with an α-amino acid or ester thereof to produce a benzodiazepine of the formula:

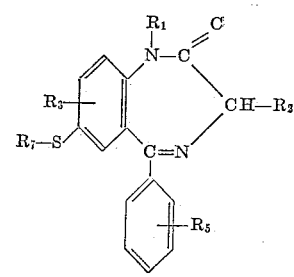

VII wherein $R_7$ is lower alkyl or hydroxy-lower alkyl and $R_1$, $R_2$, $R_3$, and $R_5$ have the same meaning as above.

If glycine or an ester thereof, e.g. an alkyl ester, is used, then $R_2$ is hydrogen. If a longer chain α-amino acid or ester is used, for example, α-alanine or its methyl ester, then a lower alkyl group is introduced into the position occupied by $R_2$.

The reaction of the aminobenzophenone with α-amino acids such as glycine, α-alanine and the like or esters of such amino acids, e.g. lower alkyl esters, is preferably effected by heating in a solvent such as pyridine, dimethylformamide or the like. It is also desirable to have an ion of a strong acid present in the reaction mixture. Therefore it is convenient to use reagents in the form of the salt of a strong organic or inorganic acid, e.g. glycine hydrochloride, glycine ethyl ester hydrochloride, α-alanine hydrochloride, α-alanine methyl ester hydrochloride or to have part of the pyridine present as pyridine hydrochloride.

The compounds of Formula VII can also be prepared by first reacting the appropriately substituted o-aminobenzophenone with an α-halo-lower alkanoyl halide and ring closing the 2-(α-halo-lower alkanoyl-amino)-5-$R_7$S-benzophenone intermediate with ammonia.

The compounds of Formula VII when $R_7$ represents lower alkyl can be oxidized with hydrogen peroxide, in a solvent such as ethanol or acetic acid, to convert the alkylmercapto group to an alkylsulfinyl or to an alkylsulfonyl group. The halo-alkyl group can be introduced by treating a corresponding compound of Formula VII containing a lower alkyl-sulfinyl group with a compound containing labile halogen.

Similarly, 2-(α-halo-lower alkanoyl - amino)-2'-$R_7$S-benzophenone intermediates can be prepared from 2'-$R_7$S-o-aminobenzophenones and the products thereby obtained can be ring-closed via reaction with ammonia. Products bearing a 2'-lower alkyl-sulfinyl or 2'-lower alkyl-sulfonyl substituent can be prepared via oxidation of compounds bearing a 2'-lower alkyl-mercapto substituent. Similarly, compounds bearing a sulfur-containing substituent (i.e. $R_7$S-, lower alkyl-SO— or lower alkyl-SO$_2$—) can be prepared from correspondingly substituted o-aminobenzophenones.

If an o-aminobenzophenone bearing an alkylsulfonyl group instead of an alkylsulfinyl group attached to the ring is used in the reaction with the α-amino acid or ester, then a benzodiazepine bearing the alkylsulfonyl group of the starting material is obtained. o-Aminobenzophenones containing an alkylsulfonyl group on the amino-bearing phenyl ring (i.e. $R_8$=lower alkylsulfonyl) are new compounds which can be produced from alkylsulfonyl anilines such as p-methylsulfonyl aniline by reaction with benzoyl chloride to obtain the benzamide derivative, reacting the latter with additional benzoyl chloride, this time in the presence of zinc chloride, to introduce the benzoyl group on the benzene nucleus, and then treating the reaction product with hydrochloric acid and acetic acid to remove the blocking group leaving the free amino group in the ortho-position.

If a 3-alkylmercaptoaniline such as 3-methylmercaptoaniline is reacted with benzoyl chloride in a Friedel-Crafts reaction then there is obtained a 4-alkylmercapto-2-aminobenzophenone which can be further processed in the same manenr described above to obtain analogous products having the substituents in another position.

When benzodiazepine compounds bearing both a sulfur-containing group and a halogen are desired, they can be synthesized by a procedure such as the following. A halogenated o-aminobenzophenone can, for example, be heated with sulfur monochloride in a hydrocarbon solvent or a hydrohalide salt of o-aminobenzophenone can be treated with the same reagent to obtain 4-benzoyl-6-halo-2,3,1-benzothiazathiolium chloride. The latter can then be treated with sodium hydrosulfite and aqueous sodium hydroxide in ethanol to produce the sodium salt of the halogenated 2-amino-3-mercaptobenzophenone. Alkylation of this product, for example, with an alkyl sulfate, alkyl halide, hydroxyalkyl halide or haloalkyl halide introduces a substituent on the sulfur. Then treatment of this intermediate with an α-amino acid or ester thereof as described above yields the benzodiazepine.

Alternatively, the same compounds can be produced by reacting a substituted o-aminobenzophenone with an α-haloacyl halide and ring closing with ammonia as described above.

Compounds of this invention containing the N-oxide structure can be produced by first forming an oxime of an alkylmercapto-o-aminobenzophenone by reacting the alkylmercapto-o-aminobenzophenone with hydroxylamine or a salt thereof, then treating the oxime with a haloacyl halide such as chloroacetyl chloride in acetic acid to produce the haloacetamido derivative which cyclizes and yields a quinazoline N-oxide, such as 2-chloromethyl-4-phenyl-quinazoline 3-oxide, wtih an alkylmercapto group on a phenyl nucleus. If the quinazoline 3-oxide is treated with ammonia or an alkylamine, ring enlargement occurs and there is obtained a product of Formula II wherein B is structure IV and $R_3$ or $R_5$ represents alkylmercapto. However, if the quinazoline 3-oxide is treated with an alkali metal hydroxide or alkaline earth metal hydroxide in an inert solvet such as acetone, dioxane, alcohol, or the like, then ring enlargement again occurs but a compound of Formula I where B is structure IV is produced.

The compounds corresponding to Formula I wherein $R_1$ and/or $R_6$ are hydrogen and those corresponding to Formula II wherein $R_6$ is hydrogen can be modified so that $R_1$ and/or $R_6$ are lower alkyl by a variety of methods. Compounds of Formula I wherein $R_1$ is lower alkyl can be obtained by reacting corresponding compounds wherein $R_1$ is hydrogen with a diazoalkane, alkyl sulfate or alkyl halide, in a medium such as ether, benzene, alcohol or dioxane. Further, the compounds of Formula I wherein $R_1$ is lower alkyl can be obtained directly from 2-(N-lower alkyl)-aminobenzophenones. Compounds of Formula I wherein $R_1$ is lower alkyl and $R_6$ is hydrogen can be converted into corresponding compounds wherein $R_6$ is lower alkyl by reaction with a lower alkyl halide. By alkylation of compounds of Formula I wherein $R_1$ and $R_6$ are both hydrogen and by altering the conditions of the reaction, any one of four reaction products can be obtained. More explicitly, the four reaction products which can be obtained are those wherein the 1-position hydrogen alone is replaced, those where the 4-position hydrogen alone is replaced, those where both the 1- and 4-position hydrogens are simultaneously replaced and those where the 4-position nitrogen is quaternized. Thus, treatment of a solution of a compound of Formula I, wherein B is

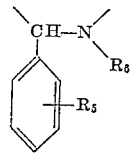

and both $R_1$ and $R_6$ are hydrogen, with an excess of lower alkyl halide gives the corresponding derivative wherein $R_6$ is converted to lower alkyl, while prolonged heating results in the quaternization of the 4-position nitrogen atom. On the other hand, by using sodium methoxide, sodium hydride or the like, to form the sodio derivative of the 1-position nitrogen atom, and reacting this with an equivalent amount of lower alkyl halide, the corresponding compound of Formula I wherein only the 1-position nitrogen atom is substituted is obtained. Using an excess of lower alkyl halide and prolonged heating with a sodio derivative of a compound of Formula I wherein either both $R_1$ and $R_6$ are hydrogen, or wherein $R_1$ alone is hydrogen, results in the 1,4-di-lower alkyl compound wherein both $R_1$ and $R_6$ are lower alkyl. Further, as discussed above, this 1,4-disubstituted compound can also be obtained by heating a compound wherein $R_1$ is lower alkyl and $R_6$ is hydrogen with an excess of lower alkyl halide. Compounds of Formula II wherein $R_6$ is hydrogen can be converted into compounds of Formula II wherein $R_6$ is lower alkyl by the appropriate above-described methods.

The benzodiazepine compounds which are basic in character, i.e. compounds of Formula II and those compounds of Formula I wherein B represents structures III or V, form acid addition salts with acids such as the mineral acids, e.g. hydrohalic acids, for example, hydrochloric acid and the like, nitric acid, sulfuric acid, phosphoric acid, etc. Such salts are also part of the invention.

The benzodiazepine compounds of this invention are useful as sedatives and can be used as tranquillizers and muscle relaxants. They are also useful as anticonvulsants. The compounds can be administered orally in therapeutic dosages by incorporating the base or pharmaceutically acceptable acid addition salts, when they can be formed, in conventional dosage forms such as tablets, capsules, suspensions, elixirs and the like.

The present application is a continuation-in-part of application Serial No. 24,686, filed April 26, 1960 and now abandoned.

The following examples serve to illustrate the invention. All temperatures are given in degrees centigrade.

Example 1

30 g. (0.15 mole) of 2-aminobenzophenone and 40 g. of sodium thiocyanate were suspended in 100 cc. of methanol. After cooling to 0°, a cold solution of 9.5 cc. of bromine (28.5 g.=0.36 mole) dissolved in 35 cc. of cold methanol (saturated with sodium bromide) was added dropwise. After completing the addition, the reaction mixture was stirred in the cold for an additional ½ hour and poured into 1 liter of cold water. After neutralization with 110 cc. of 20% $Na_2CO_3$, the product, 2-amino-5-thiocyanobenzophenone, was filtered off and crystallized from dilute ethanol to form yellow plates, M.P. 83–84°.

39 g. (0.15 mole) of 2-amino-5-thiocyanobenzophenone was suspended in 200 cc. of ethanol. The mixture was heated to 50° on the steambath and a total of 55 g. of sodium hydrosulfite and 250 cc. of 10% NaOH were added alternately in portions. The temperature was raised to 80°. At this point the reaction mixture gave a blue coloration with indanthrene yellow paper, indicating the presence of an excess of $Na_2S_2O_4$, and the complete conversion of the thiocyano-group into a mercapto-group.

After cooling to 40°, 20 cc. (27 g.=0.22 mole) of dimethyl sulfate was added dropwise. A negative reaction with lead acetate at this point indicated the absence of free mercaptan. It was stirred for 1 hour at room temperature and then the ethanol was distilled off. The aqueous phase was diluted with 700 cc. of water and the thioether was extracted with four 300 cc. portions of benzene. The benzene phase was dried and the solvent removed by vacuum distillation. The crude reaction product, 2-amino-5-methylmercaptobenzophenone, remained as a heavy oil, which upon crystallization from petroleum ether formed yellow crystals melting at 47–49°.

42 g. (0.15 mole) of 2 amino-5-methylmercaptobenzophenone was heated with 40 g. (0.29 mole) of glycine ethyl ester hydrochloride in 75 cc. of pyridine at 118–120° for 6 hours, distilling off the pyridine slowly and replacing it as needed. At the end of the heating period, the mixture was concentrated in vacuo and the residue was partitioned between 500 cc. of benzene and 200 cc. of water. The desired product was precipitated from the benzene phase by the addition of Skellysolve B and filtered off. The product, 7-methylmercapto-5-phenyl-3H-1,4-benzodiazepin-(1H)-one, crystallized from acetone in yellow needles melting at 216–218°.

Example 2

21 g. (0.082 mole) of 2-amino-5-thiocyanobenzophenone was added to 150 cc. of ethanol. The mixture was heated to 50° on a steambath and a total of 40 g. of sodium hydrosulfite and 210 cc. of 10% NaOH were added alternately in portions. On raising the temperature to 80°, the reaction mixture gave a blue color with indanthrene yellow paper, indicating the present of excess $Na_2S_2O_4$, and the complete conversion of the thiocyano-group into a mercapto-group.

Next, 13 cc. (19 g.=0.125 mole) of ethylbromide in 25 cc. ethanol was added dropwise. The mixture was then warmed to 55° whereupon a negative reaction with lead acetate indicated the absence of free mercaptan. After stirring one hour and diluting with 300 cc. of water, the oily reaction mixture was extracted with three 200 cc. portions of benzene. The benzene phase was dried and the solvent was evaporated in vacuo giving the product, 2-amino-5-ethylmercaptobenzophenone.

20 g. (0.078 mole) of 2-amino-5-ethylmercaptobenzophenone was heated with 20 g. of glycine ethyl ester hydrochloride in 75 cc. of pyridine at 114° for 5½ hours, distilling off part of the pyridine and replacing it with fresh pyridine. The reaction mixture was then evaporated in vacuo and the residual oil was partitioned between 200 cc. of benzene and 200 cc. of water. The benzene phase was concentrated, the residue was dissolved in 200 cc. of acetone. The product thus obtained, 7-ethylmercapto-5-phenyl-3H-1,4-benzodiazepin-2(1H)-one, was isolated as the hydrochloride by the addition of 15 cc. of a 20% solution of hydrogen chloride in isopropanol. The pure material, 7-ethylmercapto-5-phenyl-3H-1,4-benzodiazepin-2(1H)-one hydrochloride, crystallized in yellow needles from acetonitrile-ethanol, M.P. 273°.

Example 3

20 g. (0.078 mole) of 2-amino-5-thiocyanobenzophenone was added to 150 cc. of ethanol. The mixture was heated to 50° on the steambath and a total of 40 g. of sodium hydrosulfite and 210 cc. of 10% NaOH were added alternately in portions. On raising the temperature to 80°, the reaction mixture showed a blue color with indanthrene yellow paper, indicating the presence of an excess of $Na_2S_2O_4$, and the complete conversion of the thiocyano-group into a mercapto-group.

After cooling to room temperature, a solution of 25 cc. of n-butylbromide in 25 cc. of alcohol was added dropwise. After stirring for 2 hours at 40 to 50°, the reaction mixture was negative to lead acetate solution, indicating the absence of a free mercaptan group. 300 cc. of water was added next and the oily butylthioether was extracted with three 200 cc. portions of benzene. The benzene phase was dried and concentrated in vacuo yielding the crude reaction product, 2-amino-5-butyl-mercaptobenzophenone.

23 g. (0.081 mole) of 2-amino-5-butylmercaptobenzophenone was heated with 25 g. (0.18 mole) of glycine ethyl ester hydrochloride in 75 cc. of pyridine at 118° for 3 hours. 10 g. more of the glycine ester was added and the heating was continued for 6 hours, distilling off part of the pyridine and replacing it as needed. At the end of the heating period, the reaction mixture was concentrated to dryness in vacuo and the residue was partitioned between benzene and water. The benzene phase was evaporated to dryness to leave crude 7-butylmercapto-5-phenyl-3H-1,4-benzodiazepin-2(1H)-one. This crude residue was dissolved in about 200 cc. of hot acetone. Addition of a 20% solution of hydrogen chloride in isopropanol yielded the product 7-butylmercapto-5-phenyl-3H-1,4-benzodiazepin-2(1H)-one hydrochloride. The pure substance crystallized from a mixture of acetonitrile and ethanol in yellow needles melting at 247–249°.

Example 4

32.5 g. (0.13 mole) of 2-amino-5-thiocyanobenzophenone was suspended in 200 cc. of ethanol. The mixture was heated on the steambath to 50° and a total of 50 g. of sodium hydrosulfite and 245 cc. of 10% NaOH was added in alternate portions. The temperature of the reaction mixture was raised to 80°. At this point, the mixture gave a blue color with indanthrene yellow paper, which indicated the presence of an excess of $Na_2S_2O_4$, and the complete conversion of the thiocyano-group into a mercapto-group.

After cooling to 40°, 15 cc. 23 g.=0.18 mole) of ethylene bromohydrin in 30 cc. of alcohol was added dropwise. The mixture was stirred at room temperature for 1 hour until the negative reaction to lead acetate indicated the absence of free mercaptan. The alcohol was distilled off, the aqueous phase was diluted with 500 cc. of water and the oily product was extracted with four 300 cc. portions of benzene. The benzene phase was dried and the solvent removed by vacuum distillation. The residue was crude 2-amino-5-hydroxyethylmercaptobenzophenone.

33 g. (0.12 mole) of 2-amino-5-hydroxyethylmercaptobenzophenone was heated with 35 g. (0.25 mole) of glycine ethyl ester hydrochloride in 75 cc. of pyridine at 117° for 6 hours, slowly distilling off some of the pyridine and replacing it to keep the volume constant. The mixture was concentrated in vacuo and the residue was partitioned between benzene and water. The benzene phase was evaporated to dryness and the residue was taken up in acetone. The acetone solution was passed through a ¾ x 16 in. column containing activated alumina. Three 50 ml. fractions were collected. The middle fraction was concentrated in vacuo to give crude 7-hydroxyethylmercapto-5-phenyl-3H-1,4-benzodiazepin-2(1H)-one. After dissolving in benzene, the crude product was treated with a solution of hydrogen chloride in isopropanol. The 7-hydroxyethylmercapto - 5 - phenyl - 3H-1,4 - benzodiazepin-2(1H)-one hydrochloride thus obtained was crystallized from isopropanolethanol to obtain the pure product as yellow prisms melting at 252–253° (dec.).

Example 5

To a solution of 5.6 g. (0.02 mole) of 7-methylmercapto-5-phenyl-3H-1,4-benzodiazepin-2(1H)-one in 70 cc. of ethanol, there was added dropwise 8 cc. of 30% hydrogen peroxide. The reaction mixture was concentrated in vacuo to a syrup. The residue was triturated with 50 cc. of acetone and then cooled to 0°. The precipitated crystals of 7-methylsulfinyl - 5 - phenyl-3H-1,4-benzodiazepin-2(1H)-one were filtered off and recrystallized from a mixture of acetonitrile and ethanol to form yellow needles M.P. 254° (dec.).

Example 6

To 50 cc. of benzoyl chloride was added in portions at 120° 42g. (0.2 mole) of p-methylsulfonyl aniline hydrochloride. The reaction mixture was then heated to 170° and 35 g. of anhydrous zinc chloride was added. Heating was continued at 210–220° for 2½ hours. After cooling to 160°, a solution of 10 cc. of concentrated HCl in 55 cc. of water was added dropwise and the mixture was refluxed for 5 minutes. The reaction mixture was cooled to 10° by the addition of ice and diluted with some more water.

The precipitate was filtered off and stirred for 1 hour with a mixture of 200 cc. of water and 30 cc. of 40% NaOH. The precipitate was filtered off, washed with water, and suspended in 500 cc. of water containing 4 cc. of concentrated hydrochloric acid. The mixture was refluxed for 5 minutes and then cooled to 5° for ½ hour. The precipitate was filtered off, washed acid-free with ice-water and sucked dry. This material was refluxed in a mixture of 125 cc. of concentrated HCl and 250 cc. of glacial acetic acid for 19 hours. The reaction mixture was concentrated to dryness in vacuo and the residue was partitioned between 200 cc. of water and 400 cc. of benzene. The benzene phase was washed with dilute acid, then dilute alkali and finally with water. The product was obtained by evaporating the benzene layer to dryness and crystallizing the residue from ethanol. The pure product, 2-amino-5-methylsulfonyl-benzophenone, crystallized in yellow needles from a mixture of benzene and Skellysolve B, M.P. 159–161°.

16 g. (0.058 mole) of 2-amino-5-methylsulfonylbenzophenone was heated with 30 cc. of pyridine and 12.5 g. (0.089 mole) of glycine ethyl ester hydrochloride at 121–128° for 4½ hours. The pyridine was slowly distilled off replacing it with fresh pyridine to keep the volume constant. A total of 110 cc. of distillate was collected.

The reaction mixture was then concentrated in vacuo to a syrup and stirred with a mixture of 100 cc. of benzene and 100 cc. of water at 70° for ½ hour. The mixture was then cooled and the precipitated product was filtered off. The pure 7-methylsulfonyl-5-phenyl-3H-1,4-benzodiazepin-2(1H)-one formed yellow needles (upon crystallization from acetone-Skellysolve B) melting at 256–258°.

*Example 7*

46 g. (0.2 mole) of 2-amino-5-chlorobenzophenone was added to 120 cc. of sulfur monochloride. The reaction mixture was heated at 60–65° for 2 hours. After the addition of 200 cc. of toluene and stirring for 1½ hours, the mixture was filtered on a fritted glass funnel. The precipitate was filtered off and washed with toluene and carbon tetrachloride, and then sucked dry. The 4-benzoyl-6-chloro-2,3,1-benzothiazathiolium chloride thus obtained was added to 100 g. of ice. 1 liter of water was then added and the suspension was stirred for 2 hours. The material was filtered off and introduced at 40° into a mixture of 100 cc. of ethanol, 100 cc. of water, 100 cc. of 40% NaOH and 6 g. of sodium hydrosulfite. The reaction mixture at this point gave a blue color with indanthrene yellow paper, indicating an excess of hydrosulfite. 20 cc. of dimethyl sulfate was then added dropwise while the temperature rose to 47°. The methylation was then completed as shown by the negative reaction with lead acetate.

The reaction mixture was diluted with 100 cc. of water, stirred for 2 hours and the thioether was extracted with 3 portions of 200 cc. of benzene each. The benzene phase was dried and concentrated in vacuo to give the reaction product, 2-amino-5-chloro-3-methylmercaptobenzophenone. The same product was also obtained by the following procedure:

2-aminobenzophenone was dissolved in acetone with the addition of a saturated solution of HCl in isopropanol until acid to Congo red. The precipitated 2-aminobenzophenone hydrochloride was filtered, washed with cold acetone and sucked dry.

7 g. (0.024 mole) of 2-aminobenzophenone hydrochloride were added to 80 cc. of sulfur monochloride. After the addition of 1 g. of aluminum chloride and 10 cc. of glacial acetic acid, the reaction mixture was stirred for 3 hours at 60–80°. The mixture was then stirred with 200 cc. of toluene for four hours and the thiazathiolium compound was filtered off, washed with toluene, carbon tetrachloride and finally sucked dry. This product was added to 100 g. of crushed ice, diluted with 1 liter of water and the resulting suspension was stirred for 2 hours. The material was then filteded off and added at 42° to a mixture of 50 cc. of water, 50 cc. of alcohol, 50 cc. of 40% NaOH and 10 g. of sodium hydrosulfite. The mixture at this point gave a blue color with indanthrene yellow paper, indicating an excess of hydrosulfite. 10 cc. of dimethyl sulfate was then added dropwise while the temperature rose to 54°. The lead acetate reaction was negative at this point, indicating the completion of the methylation. The reaction mixture was diluted with 200 cc. of water, stirred for ½ hour and the thioether was extracted with three 150 cc. portions of benzene. The benzene phase was dried and yielded after concentration in vacuo the same reaction product as described in the preceding paragraph.

38 g. (0.14 mole) of 2-amino-5-chloro-3-methylmercaptobenzophenone was heated with 40 g. (0.28 mole) of glycine ethyl ester hydrochloride in 75 cc. of pyridine at 121°, distilling off the pyridine slowly and replacing it to keep the volume constant. After 5 hours the reaction mixture was allowed to cool to 80° and 15 g. of glycine ester hydrochloride was added as before. Heating was resumed for 3 hours. The reaction mixture was concentrated to dryness in vacuo and the residue was partitioned between 100 cc. of water and 100 cc. of benzene. The greenish material which separated was filtered off and dried. The product, 7-chloro-9-methylmercapto-5-phenyl-3H-1,4-benzodiazepin-2(1H)-one, crystallized in yellow needles from acetonitrile ethanol, M.P. 189–191°.

*Example 8*

75 g. (0.32 mole) of 2-amino-5-methylmercaptobenzophenone was refluxed overnight with 37 g. (0.53 mole) of hydroxylamine hydrochloride in 400 cc. of alcohol. After evaporating to dryness in vacuo, the residue was taken up in 125 cc. of water. Careful addition of 40 cc. of 40% NaOH+25 cc. of 20% $Na_4CO_3$, followed by 20 cc. of glacial acetic acid made the mixture slightly acid to litmus. 125 cc. of ether and 125 cc. of Skellysolve B were then added and the mixture was stored in the refrigerator overnight. The supernatant liquid was decanted and the gummy precipitate was dissolved in 500 cc. of ether. After washing with water, the ether solution was dried over sodium sulfate. It was then concentrated in vacuo to an oil which, on treatment with 200 cc. of ether and 100 cc. of Skellysolve B, yielded crystalline 2-amino-5-methylmercaptobenzophenone oxime. The pure oxime crystallized in yellow needles from dilute ethanol and melted at 149–150°.

15.5 g. (0.06 mole) of 2-amino-5-methylmercaptobenzophenone oxime was dissolved in 150 cc. of glacial acetic acid at 40°. 9.5 cc. (14 g.=0.125 mole) of chloroacetyl chloride was added at 55–60°. The reaction mixture was stirred at 50–60° for ½ hour and then at room temperature for 4 hours. The solution was concentrated in vacuo and the resulting oily residue was dissolved in 150 cc. of boiling methylene chloride. The solution was cooled and diluted with about 150 g. of crushed ice. 1 N NaOH was added with stirring until the mixture was alkaline to phenolphthalein. The methylene chloride phase was separated and dried over sodium sulfate. Concentration of the methylene chloride solution to incipient crystallization gave the product, 6-methylmercapto-2-chloromethyl-4-phenylquinazoline 3-oxide. The pure substance crystallized from methylene chloride in yellow needles, M.P. 155–156°.

6 g. (0.019 mole) of 6-methylmercapto-2-chloromethyl-4-phenylquinazoline 3-oxide was added in portions at 0° to 50 cc. of 50% (w./w.) methylamine in methanol. After stirring overnight at 25°, the reaction mixture was cooled in ice, the precipitate was filtered off and washed with a small amount of methanol. The pure 7-methylmercapto-2-methylamino-5-phenyl-3H-1,4-benzodiazepine 4-oxide crystallized in yellow prisms from acetonitrile, M.P. 245–246°.

By utilizing ammonia instead of methylamine, 7-methylmercapto - 2 - amino-5-phenyl-3H-1,4-benzodiazepine 4-oxide is obtained by the same procedure.

*Example 9*

To a suspension of 3.2 g. (0.01 mole) of 6-methylmercapto-2-chloromethyl-4-phenylquinazoline 3-oxide in 20 cc. ethanol, there was added dropwise 12 cc. (0.012 mole) of 1 N NaOH. The mixture was warmed to 45° and then cooled to 25°. 10 cc. of acetone was added and the reaction mixture was stirred for 3 hours, then left at room temperature for 15 hours. The mixture was cooled in ice, the precipitate was filtered off, washed with a small amount of cold ethanol and dried. The pure product, 7 - methylmercapto - 5 - phenyl-3H-1,4-benzodiazepin-2(1H)-one 4-oxide, crystallized in needles from water (containing a few drops of alcohol), M.P. 191–193°.

By reacting 7-methylmercapto-5-phenyl-3H-1,4-benzodiazepin-2(1H)-one 4-oxide with dimethyl sulfate in benzene at reflux, 1-methyl-7-methylmercapto-5-phenyl-3H-1,4-benzodiazepin-2(1H)-one 4-oxide is obtained.

Hydrogenation of 1-methyl-7-methylmercapto-5-phenyl-3H-1,4-benzodiazepin-2(1H)-one 4-oxide at room temperature and normal pressure in the presence of Raney nickel catalyst gives 1-methyl-7-methylmercapto-5-phenyl-3H-1,4-benzodiazepin-2(1H)-one.

*Example 10*

70 g. of crude 2-amino-5-methylmercaptobenzophenone was dissolved in 100 cc. of pyridine and the solution placed in a 1 liter 3 neck flask. 55 g. of p-toluenesulfochloride was added with good stirring in small portions at 25° to 45° C. 500 cc. of water was added and the supernatant aqueous layer decanted from the tosyl compound, which formed a heavy oil. Upon further addition of 250 cc. of ice water, the oil solidified to a light yellow crystalline cake which was filtered on a fritted glass-funnel and washed with ice water and sucked dry yielding 2-tosylamino-5-methylmercaptobenzophenone, as a crude product which, after recrystallization from ethanol, formed slightly yellow needles melting at 119–120°.

62 g. of crude 2-tosylamino-5-methylmercaptobenzophenone was stirred and refluxed in a 1 liter 3 neck flask with 200 cc. of ethanol and 25 cc. of 30% hydrogen peroxide for 8 hours. Stirring was afterwards continued for 4 hours without heating. The product formed a fine solid. It was filtered off after 24 hours, and sucked dry on the funnel, yielding 2-tosylamino-5-methylsulfinylbenzophenone, which after being crystallized twice from 90% ethanol formed off-white crystals melting at 168–169°.

180 cc. of 95% sulfuric acid was placed in a 3 neck flask, and cooled in an ice-water bath to 10°. 57 g. of crude 2-tosylamino-5-methylsulfinylbenzophenone was added between 10 and 15° in small portions while stirring. After all was dissolved, the cooling bath was removed, and stirring continued for 3 hours at room temperature. The flask was then kept in the refrigerator at 0° for 3 days and the solution then poured on a mixture of 1500 g. of ice and water. 100 g. of NaCl was added, and the base which separated as an oil was extracted with 600 cc. of benzene. The extraction was repeated with 400 cc. of benzene. The benzene extracts were then concentrated in vacuo to ca. 300 cc. 300 cc. of petroleum ether was added at 30°, and the flask kept in the refrigerator for 24 hours. The base crystallized out and was filtered off yielding 2-amino-5-methylsulfinylbenzophenone, which after recrystallization from ether formed yellow prisms melting at 124–126°.

*Example 11*

36 g. of 2-amino-2'-chlorobenzophenone, 100 cc. of methanol and 42 g. of sodium thiocyanate were vigorously stirred in a 0.5 liter 3 neck flask. 9.5 cc. of bromine dissolved in 35 cc. of cold methanol (saturated with NaBr) were added dropwise thereto at a temperature not exceeding 0°. The mixture was then stirred for ½ hour at 0° to 5° and the reaction mass then poured into 2500 cc. of water and neutralized with 20% sodium carbonate solution. The precipitate was filtered off by suction, washed with cold water, recrystallized from acetonitrile, water and ethanol yielding 5-thiocyano-2-amino-2'-chlorobenzophenone melting at 117–119°.

47 g. of 5-thiocyano-2-amino-2'-chlorobenzophenone was dissolved in 200 cc. of alcohol at 50° in a 1 liter, 3-neck flask. 250 cc. of sodium hydroxide (10%) and 55 g. of sodium hydrosulfite then added thereto, and the resulting mixture heated to 80°. After cooling to 40°, 20 cc. of dimethyl sulfate was added dropwise and the mixture stirred for 1 hour at room temperature. The alcohol was then distilled off and the residue extracted with dichloromethane. Concentration in vacuo yielded 5-methylmercapto-2-amino-2'-chlorobenzophenone.

30 g. of the crude 5-methylmercapto-2-amino-2'-chlorobenzophenone was dissolved in 320 cc. of benzene and 320 cc. of ether. The resulting solution was chilled to 0°, 33 g. of bromoacetyl bromide added dropwise and then 50 g. of ice. After 10 minutes a diazo-test with R-salt was negative. 100 cc. of water was then added, the resulting mixture was filtered through a fritted funnel, and separated. The benzene-ether layer was extracted with water and ammonium hydroxide, then washed neutral with water. The benzene-ether solution was then dried with sodium sulfate and concentrated. The resulting oil was crystallized from benzene and petroleum ether yielding 2-bromo-acetamido-5-methylmercapto-2'-chlorobenzophenone, which upon recrystallization from methylene chloride and petroleum ether melted at 106–108°.

21 g. of 2-bromoacetamido-5-methylmercapto-2'-chlorobenzophenone was mixed with about 100 cc. of liquid ammonia. After about 5 hours, the ammonia was evaporated and the residue treated with a mixture of water and methylene chloride. The organic layer was separated, concentrated in vacuo, and the residue dissolved in a mixture of 200 cc. of alcohol and 50 cc. of pyridine, and refluxed for 16 hours. The solution was concentrated in vacuo, the residue diluted with water, and the precipitate filtered off, yielding, upon two recrystallizations from ethanol, 7 - methylmercapto - 5 - (2' - chlorophenyl)-3H-1,4-benzodiazepine-2(1H)-one melting at 221–223°.

A sample of 5-methylmercapto-2-amino-2'-chlorobenzophenone was converted into the corresponding tosyl compound via reaction in pyridine solution with p-tosyl chloride at 40–45°. The product, 2-(p-tosylamino)-5-methylmercapto-2'-chlorobenzophenone, upon recrystallization from ethanol, formed yellow cubes melting at 125–126°.

The above-mentioned 2-amino-2'-chlorobenzophenone, its preparation and intermediates therefor, are not a part of this invention but such are disclosed hereinbelow in order that this disclosure may be complete.

A stirred solution of 75 g. of 2-amino-2'-nitrobenzophenone in 700 ml. of hot concentrated hydrochloric acid was cooled to 0° and a solution of 21.5 g. of sodium nitrite in 50 ml. of water was added in the course of 3 hours. The temperature of the suspension was kept at 2–7° during the addition. The resulting clear solution was poured into a stirred solution of 37 g. of cuprous chloride in 350 ml. of hydrochloric acid 1:1. The solid which had formed after a few minutes was filtered off, washed with water and recrystallized from ethanol. Crystals of 2-chloro-2'-nitrobenzophenone melting at 76–79° were obtained.

A solution of 20 g. of 2-chloro-2'-nitrobenzophenone in 450 ml. of ethanol was hydrogenated at normal pressure and room temperature with Raney nickel. After uptake of ca. 6 liters of hydrogen the catalyst was filtered off, and the alcohol then removed in vacuo. The residue was distilled in a bulb tube at 0.4 mm. and a bath temperature of 150–165° giving a yellow oil. The oil was dissolved in alcohol, and on addition of water, needles of 2-amino-2'-chlorobenzophenone melting at 58–60° were obtained.

*Example 12*

79.5 g. of 2'-trifluoromethyl-2-aminobenzophenone, 80 g. of sodium thiocyanate and 200 cc. of methanol were reacted at 0° with 19 cc. of bromine in 70 cc. of methanol saturated with sodium bromide. The reaction mixture was stirred for one half hour at 0° to 5° and the reaction mass then poured into 2 liters of water and neutralized with 220 cc. of a 20% sodium carbonate solution. The resultant precipitate was filtered off by suction, washed with cold water and recrystallized from ethanol, yielding crystals of 5-thiocyano-2'-trifluoromethyl-2-aminobenzophenone melting at 117-118°.

90 g. of 5-thiocyano-2'-trifluoromethyl-2-aminobenzophenone, and 400 cc. of alcohol were heated to 50°, whereupon 110 g. of sodium hydrosulfite and 500 cc. of 10% sodium hydroxide were added, and the resulting mixture heated to 80°. After cooling to 40°, 40 cc. of dimethyl sulfate was added dropwise and the resulting mixture stirred for one hour at room temperature. The alcohol was then distilled off and the residue diluted with 1400 cc. of water and extracted with dichloromethane. The dichloromethane extract was concentrated in vacuo, yielding 5-methylmercapto-2'-trifluoromethyl-2-aminobenzophenone.

To a mixture of 64 g. of 5-methylmercapto-2'-trifluoromethyl-2-aminobenzophenone, 300 cc. of benzene, 100 cc. of ether and 30 g. of ice was added 45 g. of bromoacetyl bromide at 0° to 5° (diazo-test was negative). After 15 minutes of stirring, 200 cc. of ice water was added thereto and the resulting mixture separated. The organic layer was washed with water and dilute ammonia, dried over sodium sulfate and concentrated in vacuo. Addition of petroleum ether yielded crystals of 5-methylmercapto-2'-trifluoromethyl-2-bromoacetamidobenzophenone which, after recrystallization from methylene chloride and petroleum ether, melted at 104–5°.

60 g. of 5-methylmercapto-2'-trifluoromethyl-2-bromoacetamidobenzophenone was stirred with about 300 cc. of liquid ammonia for 5 hours. After evaporation of the ammonia, 500 cc. of dichloromethane and 300 cc. of water were added to the residue, and the resulting mixture stirred for 30 minutes. The organic layer was then separated, dried over sodium sulfate and concentrated in vacuo, yielding 5-methylmercapto-2'-trifluoromethyl-2-amino-acetamidobenzophenone, which after recrystallization from benzene/petroleum ether melted at 77–78°.

20 g. of 5-methylmercapto-2'-trifluoromethyl-2-aminoacetamidobenzophenone was refluxed 20 hours in 200 cc. of pyridine and then concentrated in vacuo. Ether was added and the resulting solid filtered off, yielding 7-methylmercapto-5-o-trifluoromethylphenyl-3H-1,4-benzodiazepin-2(1H)-one, which, upon recrystallization from benzene, melted at 199–200°.

The above-mentioned 5-methylmercapto-2'-trifluoromethyl-2-aminoacetamidobenzophenone and its preparation are not a part of this invention, but such are disclosed hereinabove in order that the present disclosure may be complete.

2 g. of 2-amino-5-methylmercapto-2'-trifluoromethylbenzophenone in 5 cc. of pyridine was reacted at 40–50° with 3.5 g. of p-tosyl chloride. The product, 2-(p-tosylamino)-5-methylmercapto-2'-trifluoromethylbenzophenone, upon recrystallization from ethanol, formed light yellow crystals melting at 122–123°.

The above-mentioned 2'-trifluoromethyl-2-aminobenzophenone, its preparation and intermediates therefor, are also not a part of this invention, but such are disclosed hereinbelow in order that the present disclosure may be complete.

A solution of o-trifluoromethyl phenyl magnesium bromide was prepared in the usual manner from 50.0 g. of o-bromobenzotrifluoride, 5.55 g. of magnesium and 110 ml. of anhydrous ether. The Grignard reagent can also be prepared by reacting 39.7 g. of o-chlorobenzotrifluoride with 5.55 g. of magnesium in tetrahydrofurane. This reaction solution was added with stirring at 20° over a period of 3 hours to a solution of 33.0 g. of 2-methyl-4H-3,1-benzoxazin-4-one in 300 ml. of methylene chloride. The resulting dark but clear solution was left at room temperature for 16 hours and was then poured over a mixture of 50 g. of ammonium chloride and 600 g. of crushed ice. Extraction with ether gave a crude reaction product which was directly hydrolyzed by refluxing for one hour in a mixture of 240 ml. of ethanol and 240 ml. of 3 N sodium hydroxide. After standing overnight, the reaction mixture was extracted with ether. The ether layer was washed with water and concentrated in vacuo yielding an oil. This was purified in two portions by chromatography on the 20-fold amount of neutral alumina (activity grade III; e.g. containing 6% of water). Elution with petroleum ether (60–70°) and a mixture of petroleum ether (60–70°) and ether (9:1) followed by crystallization from a mixture of ether and hexane yielded 2-amino-2'-trifluoromethylbenzophenone, melting at 94–96° (yellow prisms).

*Example 13*

A solution of 24.5 g. of crude 2-amino-5-methylmercaptobenzophenone in a mixture of 250 cc. of ether and 250 cc. of benzene was stirred while 13.4 cc. of bromoacetyl bromide was added during 20 minutes. The temperature was kept below 15° by the addition of ice to the reaction mixture. Some insoluble material was filtered off and the organic layer was washed first with water, then with 5% sodium bicarbonate solution until neutral, and finally with water. After drying over anhydrous sodium sulfate the organic layer was concentrated in vacuo to an oil which was crystallized from ether and recrystallized from methanol yielding yellow prisms of 2-bromoacetamido-5-methylmercaptobenzophenone melting at 114–115°.

A solution of 5 g. of 2-bromoacetamido-5-methylmercaptobenzophenone in 300 cc. of liquid ammonia was stirred for 4 hours. The ammonia was then evaporated and the residue refluxed with 100 cc. of ethanol for 16 hours. The ethanol solution was concentrated in vacuo and the residue stirred for 30 minutes with 100 cc. of water and then filtered and dried yielding a crude product, 7-methylmercapto-5-phenyl-3H-1,4-benzodiazepin-2(1H)-one, which upon recrystallization from 125 cc. of ethanol formed pale yellow blades melting at 261–218°.

A stirred suspension of 2.74 g. of 7-methylmercapto-5-phenyl-3H-1,4-benzodiazepin-2(1H)-one in 100 cc. of methanol (60°) was treated with 2.25 cc. of 4.44 N sodium methoxide in methanol. The mixture became yellow and was stirred and refluxed until all the suspended material had been dissolved. The solution was then concentrated in vacuo and the last traces of methanol removed by evaporating with the addition of benzene. The white residue was dissolved in 50 cc. of dimethylformamide, yielding a yellow solution of the sodio derivative which rapidly crystallized on stirring. 0.72 cc. of methyl iodide was added to the suspension. The clear solution which formed was stirred for 30 minutes at room temperature and then concentrated in vacuo. The residue was partitioned between water and ether, the organic layers washed with water, separated, dried, and concentrated in vacuo to give an almost clear gum which was chromatographed on 90 g. of grade III alumina containing 6% of water using a benzene-hexane mixture (5:2). A practically colorless material was eluted which upon recrystallization from hexane yielded the product, 1-methyl-7-methylmercapto-5-phenyl-3H-1,4-benzodiazepin-2(1H)-one, as a colorless amorphous powder melting at 35–45°.

*Example 14*

A solution of 15 g. of 7-methylmercapto-5-phenyl-3H-

1,4-benzodiazepin-2(1H)-one 4-oxide and 25 cc. of phosphorus trichloride and 700 cc. of chloroform was refluxed for 30 minutes. The solution was then poured on ice, the mixture made alkaline with 50% sodium hydroxide, and the organic layer separated. The aqueous layer was extracted repeatedly with methylene chloride. The organic layers were combined, dried, filtered over a filter aid and concentrated in vacuo to dryness. The residue was crystallized from acetone and yielded 7-methylmercapto - 5 - phenyl - 3H - 1,4 - benzodiazepin - 2(1H)-one, melting at 216–218°.

*Example 15*

To a mixture of 9 g. of 7-methylsulfinyl-5-phenyl-3H-1,4-benzodiazepin-2(1H)-one and 200 ml. of metylene chloride which was stirred vigorously in a ½ liter 3 neck flask, 6 cc. of thionyl chloride was added at room temperature. At first a clear yellow solution resulted. After a few minutes stirring, the hydrochloride of the reaction product crystallized. The mixture was refluxed for 1 hour and filtered at room temperature through a fritted glass funnel, and washed with methylene chloride. Upon crystallization from methanol the product, 7-(chloromethylmercapto)-5-phenyl-3H - 1,4 - benzodiazepin-2(1H)-one hydrochloride, melted at 258–260° (dec.).

*Example 16*

To a solution of 7.15 g. of 2-amino-5-methylsulfinylbenzophenone in 200 ml. of benzene was added 2.45 ml. of bromoacetyl bromide. After an hour, the mixture was washed several times with water, then the organic layer was separated, dried, concentrated in vacuo and the residue crystallized from a mixture of benzene and hexane (5:2). The first fraction consisted of 2'-benzoyl-2-bromo-4'-bromomethylthioacetanilide. The mother liquors on chromatography yielded more of the same material. After recrystallization from a mixture of benzene and hexane (5:2), the product formed colorless crystals melting at 144–146°.

*Example 17*

10.0 g. platinum oxide was reduced in 500 ml. of acetic acid at atmospheric pressure and room temperature. To the suspension of the reduced catalyst, a solution of 41.0 g. of 7-methylmercapto-5-phenyl-3H-1,4-benzodiazepin-2(1H)-one in 500 ml. of glacial acetic acid was added and hydrogenated to completion (2980 cc. of hydrogen absorbed). Filtration of the catalyst, and concentration of the filtrate under reduced pressure, gave the crude product which was dissovled in methylene chloride (300 cc.). The resulting solution was then washed with 5 N ammonium hydroxide solution (3×50 cc.), water (3×50 cc.), dried with anhydrous sodium sulfate, filtered and evaporated. Recrystallization from ethanol yielded 7-methylmercapto - 4,5 - dihydro - 5 - phenyl - 3H - 1,4-benzodiazepin-2(1H)-one as off-white needles melting at 150.5–152.5°.

A solution of 21.8 g. of 7-methylmercapto-4,5-dihydro-5-phenyl-3H-1,4-benzodiazepin-2(1H)-one in 185 ml. of dimethylformamide was stirred and refluxed for 1 hour with 4.56 g. of sodium methoxide (added in the form of a methanolic solution containing 4.35 mmoles of sodium methoxide per cc. of solution). The sodio derivative thus formed was treated with 109.1 g. of methyl iodide and the solution refluxed for a further two hours. After the excess methyl iodide had been distilled off, the reaction mixture was poured into 1000 ml. of water, and extracted 4 times with 150 ml. portions of methylene chloride. The extracts were combined, treated with decolorizing carbon, dried with sodium sulfate, and filtered. The solution was then refluxed and dissolved in a small volume of methanol and treated with 1 equivalent of hydrogen chloride added as a methanolic hydrogen chloride solution (0.9 N). The solvent was then removed under reduced pressure and the residue was crystallized from hexane/ether yielding 7-methylmercapto-1,4-dimethyl - 4,5 - dihydro - 5 - phenyl - 3H - 1,4 - benzodiazepin-2-(1H)-one as white prisms melting at 96–98°.

A mixture of 6.2 g. of 7-methylmercapto-1,4-dimethyl-4,5 - dihydro - 5 - phenyl - 3H - 1,4 - benzodiazepin-2(1H)-one, 3 ml. of 30% hydrogen peroxide and 40 ml. of absolute ethanol was stirred and refluxed for eight hours. Approximately one half of the ethanol was removed by distillation and the residue poured into 500 ml. of water. The product was extracted into methylene chloride (100 ml.) which was washed with water (3×25 ml.), dried over anhydrous sodium sulfate, filtered and evaporated to dryness. The residual yellow gum was repeatedly crystallized from acetone, hexane mixture yielding 4,5 - dihydro - 1,4 - dimethyl - 7 - methylsulfinyl-5-phenyl-3H,1,4-benzodiazepin-2(1H)-one as colorless plates, M.P. 160–161°.

*Example 18*

A mixture of 176 g. (1.125 m.) of ortho-fluoro benzoyl chloride and 64 g. (0.5 m.) of para-chloraniline was stirred and heated to 180° C., at which temperature 87 g. (0.64 m.) of zinc chloride was introduced, the temperature raised to 200–205° C. and maintained there for forty minutes. The golden colored melt was quenched by the careful addition of 500 ml. of 3 N hydrochloric acid and the resulting mixture refluxed for five minutes. The acid solution was decanted and the process repeated three times to remove all ortho-fluorobenzoic acid. The grey granular residue was dissolved in 300 ml. of 75% (vol./vol.) sulphuric acid and refluxed for forty minutes to complete hydrolysis. The hot solution was poured over 1 kg. of ice and diluted to two liters with water. The organic material was extracted with four 300 ml. portions of methylene chloride which were subsequently washed with two 500 ml. portions of 3 N hydrochloric acid to remove traces of para-chloroaniline, three 500 ml. portions of 5 N sodium hydroxide solution to remove ortho-fluorobenzoic acid, and finally two 200 ml. portions of saturated brine solution. The methylene chloride extract was dried over anhydrous sodium sulphate and the solvent removed to give the crude aminobenzophenone. Recrystallization from methanol gave 2-amino-5-chloro-2'-fluorobenzophenone yellow needles, (M.P. 94–95° C.).

A solution of sodium methylmercaptan (96 ml. of a soluti containing 200 mmoles of NaSCH$_3$) in 2-ethoxyethanol was refluxed for three hours with 25 g. of 2-amino-5-chloro-2'-fluorobenzophenone. The solution was concentrated to approximately 30 ml. by distillation and the residue partitioned between methylene chloride (200 ml.) and water (200 ml.). The layers were separated, and the organic layer was washed with 3 N hydrochloric acid (2×100 ml.), water (3×100 ml.), dried over anhydrous sodium sulfate, filtered and concentrated to give as an oil crude 2 - amino - 5 - chloro-2'-methylthiobenzophenone. Upon being recrystallized from hexane it formed yellow plates M.P. 100–100.5°.

The above-mentioned 2-amino-5-chloro-2'-methylthiobenzophenone, its preparation and intermediates therefor, are not a part of this invention, but such are disclosed hereinabove in order that the present disclosure may be complete.

The crude 2 - amino - 5 - chloro-2'-methylthiobenzophenone from the previous reaction was dissolved in 200 ml. of ether and 21 ml. of bromoacetyl bromide was added with stirring. After the reaction had subsided, the reaction mixture was washed with water (3×100 ml.) and concentrated to a small volume. The product was filtered and recrystallized from methanol to give 2-bromoacetamido - 5 - chloro - 2'-methylthiobenzophenone, as white needles, M.P. 107–8°.

4.0 g. of 2-bromoacetamido-5-chloro-2'-methylthiobenzophenone was carefully added to 200 ml. of liquid ammonia. The ammonia was allowed to evaporate overnight and the residue was partitioned between ether (400 ml.) and water (1 liter). The layers were separated and the ether layer was washed with water (3×200 ml.), dried over anhydrous sodium sulfate, filtered and concentrated to approximately 75 ml. Petroleum ether (10 ml.) was added and the mixture cooled. The product was filtered yielding 2-aminoacetamido-5-chloro-2'-methylthiobenzophenone, as yellow plates, M.P. 125–6°.

The above-mentioned 2-aminoacetamido-5-chloro-2'-methylthiobenzophenone is not a part of this invention, but is disclosed herein in order that this disclosure may be complete.

A mixture of 2.1 g. of 2-aminoacetamido-5-chloro-2'-methylthiobenzophenone, 50 ml. of benzene and 100 ml. of pyridine was refluxed for thirty-six hours using a 1 meter column packed with glass helices. Water was separated at the top of the column using a Dean-Stark head. The reaction mixture was then concentrated to a dark brown oil which was crystallized several times from an acetone/hexane mixture yielding 7-chloro-5-(2-methylthiophenyl)-3H-1,4-benzodiazepin-2(1H)-one, as white needles, M.P. 184–5°.

*Example 19*

10 g. of 7-ethylmercapto-5-phenyl-3H-1,4-benzodiazepin-2(1H)-one, 125 cc. of ethanol and 18 cc. of 30% hydrogen peroxide were refluxed for 2 hours and the reaction solution then concentrated in vacuo, after which 100 cc. of acetone was added to the residue. The resulting precipitate was filtered off by suction at 10°, and washed on the funnel with cold acetone, yielding off-white crystals of 7-ethylsulfinyl-5-phenyl-3H-1,4-benzodiazepin-2(1H)-one, melting at 195–196°.

8.5 g. of 7-ethylsulfinyl-5-phenyl-3H-1,4-benzodiazepin-2(1H)-one, 200 cc. of dichloromethane and 6 cc. of thionylchloride were refluxed for 1 hour. From the at first clear yellow solution, there crystallized the hydrochloride of (7-α-chloroethylmercapto)-5-phenyl-3H-1,4-benzodiazepin-2(1H)-one which was filtered off at 15° and washed with dichloromethane on the funnel, yielding slightly yellow crystals thereof which melted at 236–238°. Recrystallization of the so-obtained hydrochloride from ethanol yielded the free base as light yellow crystals melting at 195–196°.

We claim:

1. A compound of the formula:

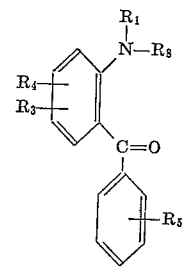

wherein $R_1$ is selected from the group consisting of hydrogen and lower alkyl; $R_3$ is selected from the group consisting of $-S-R_7$, $-SO$-lower alkyl and $-SO_2$-lower alkyl; $R_4$ is selected from the group consisting of hydrogen and halogen; $R_5$ is selected from the group consisting of hydrogen, halogen and trifluoromethyl; $R_7$ is selected from the group consisting of cyano, lower alkyl, hydroxy-lower alkylene and halo-lower alkylene; and $R_8$ is selected from the group consisting of hydrogen, α-halo-lower alkanoyl and p-tosyl.

2. 2-amino-5-thiocyanobenzophenone.
3. 2-amino-5-methylmercaptobenzophenone.
4. 2-amino-5-methylmercapto-2'-halobenzophenone.
5. 2-amino-5-methylmercapto-2'-trifluoromethylbenzophenone.
6. 2-amino-5-methylsulfinylbenzophenone.
7. 2-haloacetamido-5-methylmercaptobenzophenone.

References Cited in the file of this patent

UNITED STATES PATENTS 2,830,088   Hubner et al.  ---------- Apr. 8, 1958
2,893,992   Sternbach  -------------- July 7, 1959

OTHER REFERENCES

Hoi et al.: J. Org. Chem., vol. 17, pp. 350–7 (1952).

UNITED STATES PATENT OFFICE
CERTIFICATE OF CORRECTION

Patent No. 3,121,103            February 11, 1964

Oscar Keller et al.

It is hereby certified that error appears in the above numbered patent requiring correction and that the said Letters Patent should read as corrected below.

Column 1, lines 16 to 21, formula I should appear as shown below instead of as in the patent:

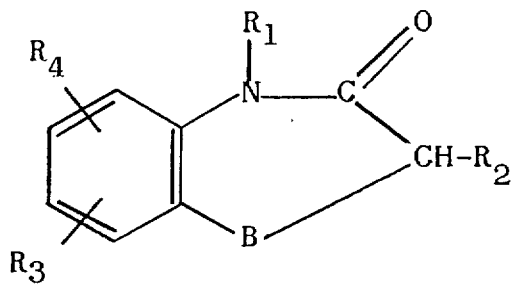

lines 24 to 28, formula II should appear as shown below instead of as in the patent:

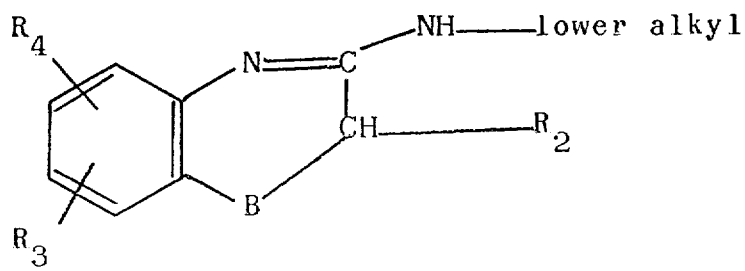

line 63, for "-S-R₇,SO-" read -- -S-R₇-SO- --; column 4, lines 3 to 13, formula VII should appear as shown below instead of as in the patent:

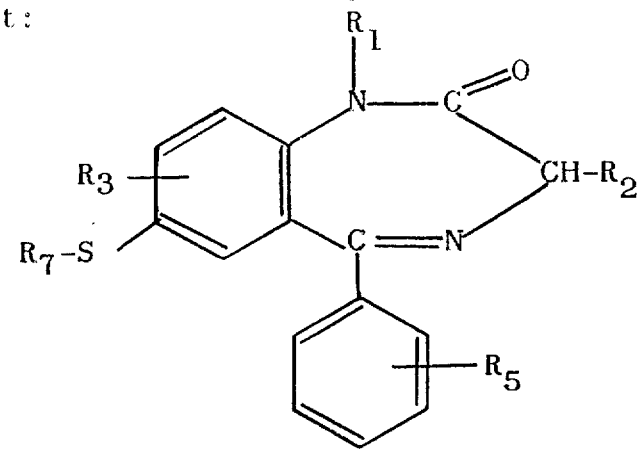

3,121,103 line 64, for "R₈-lower" read -- R₃-lower --; column 7, line 13, for "benzodiazepin-(1H)" read -- benzodiazepin-2(1H) --; column 8, line 25, for "15 cc. 23 g." read -- 15 cc. (23 g. --; column 10, line 2, for "filteded" read -- filtered --; line 32, for 75 g." read -- 78 g. --; line 37, for "Na4CO₃" read read -- Na₂CO₃, --; column 14, lines 57 and 58, for "dimethylforamide" read -- dimethylformamide --.

Signed and sealed this 10th day of November 1964.

(SEAL)
Attest:

ERNEST W. SWIDER
Attesting Officer

EDWARD J. BRENNER
Commissioner of Patents